United States Patent
Bates et al.

(10) Patent No.: US 9,092,562 B2
(45) Date of Patent: Jul. 28, 2015

(54) CONTROLLING ACCESS TO VARIABLES PROTECTED BY AN ALIAS DURING A DEBUGGING SESSION

(71) Applicant: International Business Machines Corporation, Armonk, NY (US)

(72) Inventors: Cary L. Bates, Rochester, MN (US); Kershaw S. Mehta, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 65 days.

(21) Appl. No.: 13/895,451

(22) Filed: May 16, 2013

(65) Prior Publication Data

US 2014/0344784 A1    Nov. 20, 2014

(51) Int. Cl.
*G06F 9/44*        (2006.01)
*G06F 11/36*       (2006.01)
*G06F 21/00*       (2013.01)
*G06F 21/62*       (2013.01)

(52) U.S. Cl.
CPC .......... *G06F 11/362* (2013.01); *G06F 11/3696* (2013.01); *G06F 21/00* (2013.01); *G06F 21/62* (2013.01)

(58) Field of Classification Search
CPC ...... G06F 21/00–21/62; G06F 11/36–11/3696
See application file for complete search history.

(56) References Cited

U.S. PATENT DOCUMENTS

| | | | |
|---|---|---|---|
| 7,506,313 B2 * | 3/2009 | Bates et al. | 717/125 |
| 2003/0167459 A1 * | 9/2003 | Bates et al. | 717/125 |
| 2003/0221121 A1 | 11/2003 | Chow et al. | |
| 2006/0048099 A1 * | 3/2006 | Templin et al. | 717/124 |
| 2006/0053307 A1 | 3/2006 | Xu et al. | |
| 2006/0161896 A1 * | 7/2006 | Hicks et al. | 717/124 |
| 2007/0079292 A1 * | 4/2007 | Chen et al. | 717/127 |
| 2008/0115011 A1 * | 5/2008 | Codrescu et al. | 714/38 |
| 2012/0110552 A1 * | 5/2012 | Bates | 717/129 |
| 2012/0159447 A1 * | 6/2012 | Boisde et al. | 717/124 |
| 2012/0272329 A1 | 10/2012 | Grammer et al. | |
| 2013/0104108 A1 * | 4/2013 | Bates | 717/129 |
| 2013/0132780 A1 * | 5/2013 | Bohnet et al. | 714/45 |

OTHER PUBLICATIONS

Nielsen, Niklas Quarfot, Debug Interfaces for Modern Operating Systems, 2010, pp. 1-75.*
Cadar, Cristian, et al., Data Randomization, 2008, pp. 1-14.*
Mantel, Heiko, et al., Static Confidentiality Enforcement for Distributed Programs, 2002, pp. 376-394.*
Qi, Xin, et al., Masked Types, 2008, pp. 1-32.*
Huffmire, Ted, et al., Enforcing memory policy specifications in reconfigurable hardware, 2008, pp. 197-215.*

(Continued)

*Primary Examiner* — Thuy Dao
*Assistant Examiner* — Christopher Franco
(74) *Attorney, Agent, or Firm* — Penny L. Lowry; James R. Nock (57) ABSTRACT

According to embodiments of the invention, methods, computer readable storage medium, and a computer system for controlling access to variables protected by an alias are disclosed. The method may include monitoring, during a debug session, each attempt by a debugger to apply an operator to one or more variables protected by an alias. The method may also include determining whether to allow an application of an operator to a variable protected by an alias, wherein the determination is based at least in part on one or more rules.

12 Claims, 3 Drawing Sheets

(56) References Cited

OTHER PUBLICATIONS

Ikawa, Yohei, et al., A New Document Masking Approach for Removing Confidential Information, 2007, pp. 107-114.*

Anonymous, "Method and Apparatus for log obfuscation to prevent sensitive info exposure", IP.Com Prior Art Database, IP.Com No. IPCOM000217620D, Published electronically May 9, 2012.

* cited by examiner

FIG. 1

ALIAS PROTECTED VARIABLE DATA — 134

| | | VARIABLE A | VARIABLE B | VARIABLE C | VARIABLE D | VARIABLE E |
|---|---|---|---|---|---|---|
| OPERATOR 1 | THRESHOLD | 0 | 5 | 10 | 0 | 10 |
| | COUNT | 0 | 3 | 4 | 0 | 6 |
| OPERATOR 2 | THRESHOLD | 5 | 15 | 5 | 0 | 20 |
| | COUNT | 5 | 12 | 1 | 0 | 8 |
| OPERATOR 3 | THRESHOLD | 0 | 0 | 0 | 0 | 0 |
| | COUNT | 0 | 0 | 0 | 0 | 0 |
| OPERATOR 4 | THRESHOLD | 10 | 10 | 10 | 0 | 10 |
| | COUNT | 4 | 6 | 4 | 0 | 4 |
| OPERATOR 5 | THRESHOLD | 5 | 5 | 10 | 0 | 15 |
| | COUNT | 2 | 2 | 5 | 0 | 6 |

CONTROLLING ACCESS TO VARIABLES PROTECTED BY AN ALIAS DURING A DEBUGGING SESSION

TECHNICAL FIELD

The present invention relates to the field of computer systems, and more specifically, to computer systems that execute instructions and a system for debugging such instructions.

BACKGROUND

Computer systems typically include a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

SUMMARY

According to embodiments of the invention, methods, computer readable storage medium, and a computer system for controlling access to variables protected by an alias are disclosed. The method may include monitoring, during a debug session, each attempt by a debugger to apply an operator to one or more variables protected by an alias. The method may also include determining whether to allow an application of an operator to a variable protected by an alias, wherein the determination is based at least in part on one or more rules.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

Debugging is often necessary post-development, or after the computer program has been used by an end-user. This may be a result of an error of the program from the developer, or it may be from the end-user using the program in a manner not contemplated by the developer. Post-development bugs may be discovered by the developer or by the end-users. In either case, the developer may be required to find and correct the bug through additional debugging. Oftentimes, the developer is required to access the end-user's system in order to complete a post-development debugging. This may include accessing an end-user's system containing confidential information. By allowing the developer access to their system in order to complete a post-development debugging, the end-user exposes their confidential information associated with the system. Confidential information may be masked from the developer by using an alias to protect the true value of confidential information such as variables. However, the true value may remain discoverable through the use of operators applied to the variables. Simply blocking the application of operators to the variables protected by an alias may not be a viable solution as it may limit the ability of the developer to complete the post-development debugging.

Embodiments of the present invention provide a system for controlling access to variables protected by an alias. When a programmer or developer attempts to apply an operator to a variable during a debug session, a determination may be made as to whether the variable is protected by an alias and therefore confidential information. If the variable is protected by an alias then one or more rules associated with the operator, the variable, or both are applied in order to determine if the application should be allowed. For example, a particular operator may be allowed to be applied to a particular variable protected by an alias a certain number of times. This number may protect the true value of the variable from discovery while still maintaining an acceptable level of debugger operation.

Figure 1:
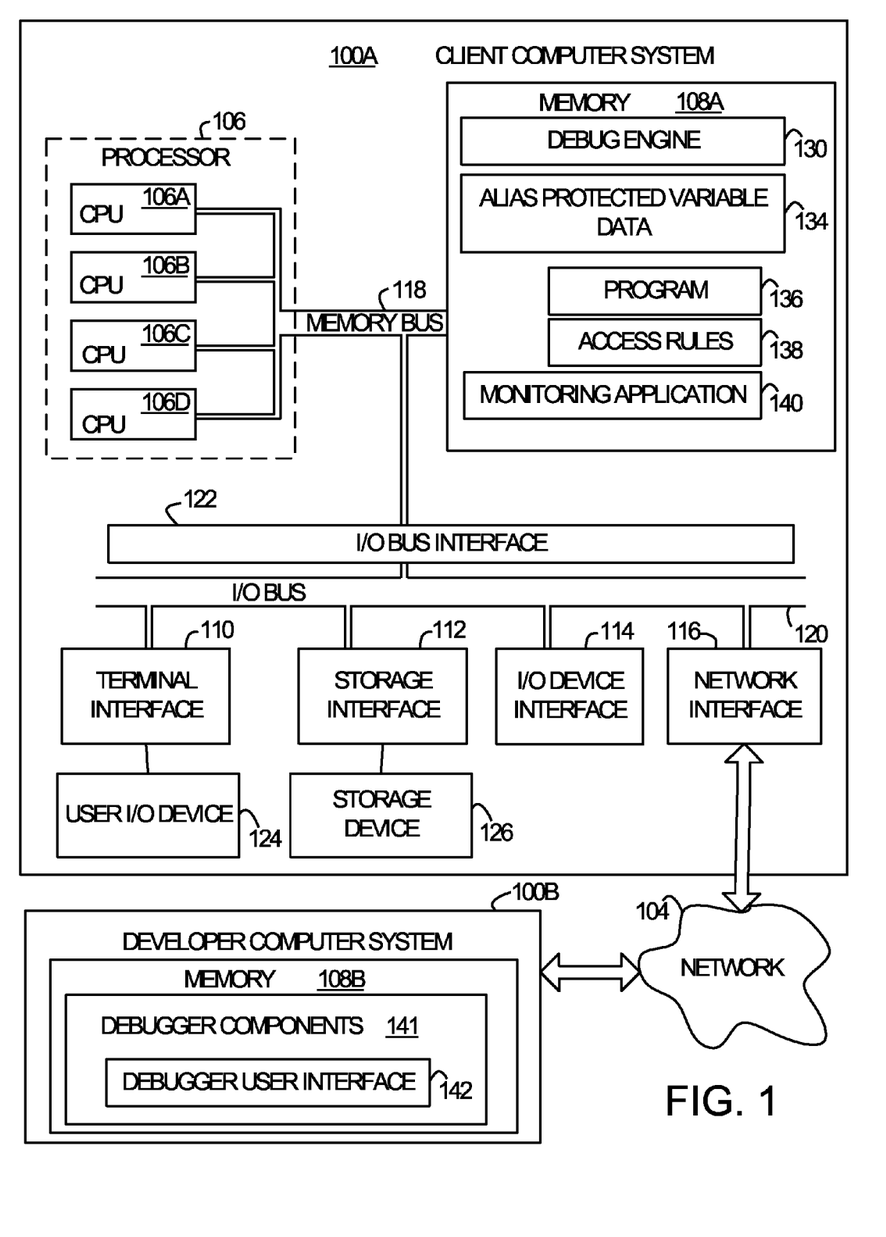
FIG. 1 depicts a high-level block diagram of an exemplary system for implementing an embodiment of the invention.

Referring to the drawings, wherein like numbers denote like parts throughout the several views, FIG. 1 depicts a high-level block diagram representation of a client computer system 100A connected to a developer computer system 100B via a network 104, according to an embodiment of the present invention. The terms "developer" and "client" are used herein for convenience only, and in various embodiments a computer system that operates as a client computer in one environment may operate as a developer computer in another environment, and vice versa. The mechanisms and apparatus of embodiments of the present invention apply equally to any appropriate computing system, including a computer system that does not employ the client-developer model.

Although not depicted in FIG. 1, the developer computer system 100B contains the same components as the client computer system 100A. The major components of the computer system 100A may include one or more processors 106, a main memory 108A, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100A may contain one or more general-purpose programmable central processing units (CPUs) 106A, 106B, 106C, and 106D, herein generically referred to as the processor 106. In an embodiment, the computer system 100A may contain multiple processors typical of a relatively large system; however, in another embodiment the computer system 100A may alternatively be a single CPU system. Each processor 106 may execute instructions stored in the main memory 108A and may include one or more levels of on-board cache.

In an embodiment, the main memory 108A may include a random-access semiconductor memory, storage device, or storage medium (either volatile or non-volatile) for storing or encoding data and programs. In another embodiment, the main memory 108A may represent the entire virtual memory of the computer system 100A, and may also include the virtual memory of other computer systems coupled to the computer system 100A or connected via the network 104. The main memory 108A may be conceptually a single monolithic entity, but in other embodiments the main memory 108A may be a more complex arrangement, such as a hierarchy of caches and other memory devices.

The main memory 108A may store or encode a debug engine 130, alias protected variable data 134, programs 136, access rules 138, and monitoring application 140, hereafter collectively referred to as "memory components." The main memory 108B may store or encode various debugger components 130, including a debugger user interface 142. The operation of debugging may be facilitated by a debugger comprising a debugger user interface 142 and the debug engine 130. Further, the debugger may include additional components not shown. Although the memory components are illustrated as being contained within the memories 108A and 108B in the respective computer systems 100A and 100B, in other embodiments some or all of them may be on other computer systems and may be accessed remotely, e.g., via the network 104. The computer system 100A may use virtual addressing mechanisms that allow the programs of the computer system 100A to behave as if they only have access to a large, single storage entity instead of access to multiple, smaller storage entities. Thus, while the memory components are illustrated as being contained within the main memory 108A and 108B, these components are not necessarily completely contained in the same storage device at the same time. Further, although the memory components are illustrated as being separate entities, in other embodiments some of them, portions of some of them, or all of them may be packaged together.

In an embodiment, the memory components may include instructions or statements that execute on the processor 106 or instructions or statements that may be interpreted by instructions or statements that execute on the processor 106, to carry out the functions as further described below with reference to FIGS. 2 and 3. In another embodiment, memory components, or two or more of these components may be implemented in hardware via semiconductor devices, chips, logical gates, circuits, circuit cards, other physical hardware devices, or a combination of these devices in lieu of, or in addition to, a processor-based system. In an embodiment, the memory components, or two or more of these components may include data in addition to instructions or statements.

The memory bus 118 may provide a data communication path for transferring data among the processor 106, the main memory 108A, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices using a user interface, in order to provide input data and commands to the user I/O device 124 and the computer system 100A, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108A, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100A to other digital devices and computer systems; such paths may include, e.g., one or more networks 104.

Figure 2:
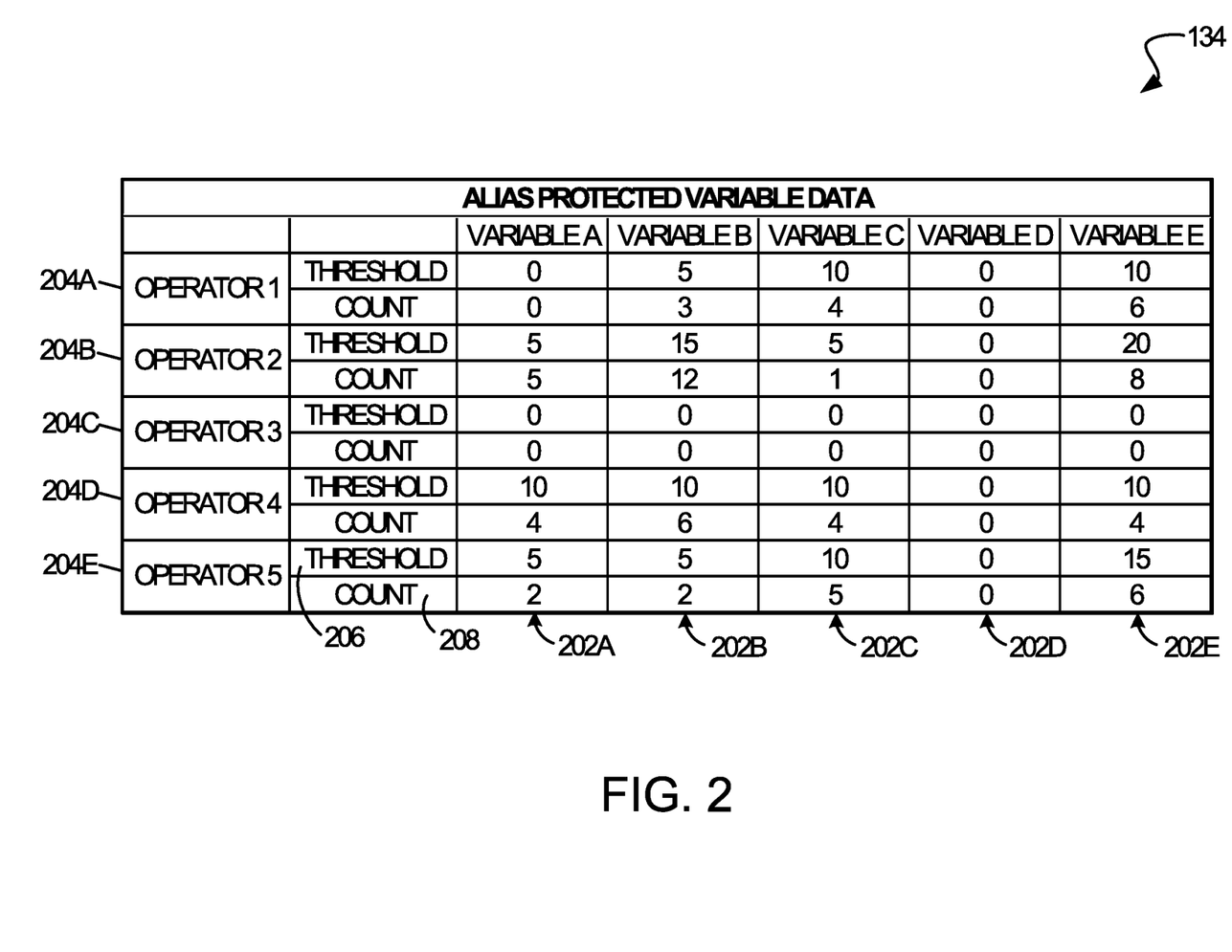
FIG. 2 depicts a diagram of an example data structure for alias protected variable data, according to an embodiment of the invention.

FIG. 2 depicts a diagram of an example data structure for alias protected variable data 134, according to an embodiment of the invention. The alias protected variable data 134 may include example records of variables 202A, 202B, 202C, 202D and 202E, hereafter collectively referred to as variables 202. The variables 202 may be variables protected by an alias. The variables 202 may require to be protected by an alias because they are a form of confidential information. Also, the variables 202 may be associated with a program 136 within a client computer system 100A. The alias protected variable data 134 may also include example records of operators 204A, 204B, 204C, 204D and 204E, hereafter collectively referred to as operators 204. The operators 204 may be operators that require a limitation as to their application to variables protected by an alias. Examples of operators 204 may be operators in the C and C++ programming (e.g. +, −, *, /), an array operator, or Boolean operators.

Each operator 204 may contain a threshold field 206 and a count field 208. The threshold field 206 may identify the maximum number of instances that the associated operator 204 may be applied to the corresponding variable 202. The count field 208 may identify the number of instances that the associated operator 204 has been applied to the corresponding variable 202 within a particular period, for example during a debug session. The values of the threshold fields 206 may reflect the access rules 138 associated with both the corresponding operators 204 and the corresponding variables 202. For example, if the value of a threshold field 206 is zero, then the associated operator 204 is disallowed from being applied to the associated variable 202. Furthermore, if the value of every threshold field 206 for a particular operator 204 is zero, then the associated operator 204 is disallowed from being applied to any variable 202. Correspondingly, if the value of every threshold field 206 associated with a particular variable 202 is zero then all operators 204 are disallowed from being applied to that variable 202.

Another example of an access rule 138 may be to disallow an operator 204 from being applied to a variable 202 when a count of instances the operator 204 has previously been applied to the variable 202 has reached a threshold. This rule 138 may be administered by referencing the alias protected variable data 134 before allowing the operator 204 to be applied to the variable 202. If the value of the count field 208 is less than the value of the threshold field 206 for the corresponding operator 204 and variable 202, then the attempt to apply the operator 204 to the variable 202 is allowed and the count 208 in incremented by a value of one. In various embodiments, the access rules 138, the value of each threshold field 206, the operators 204, and the variables 202 may be determined by an administrator of the client computer system 100A, and may be monitored and updated by the monitoring application 140.

Figure 3:
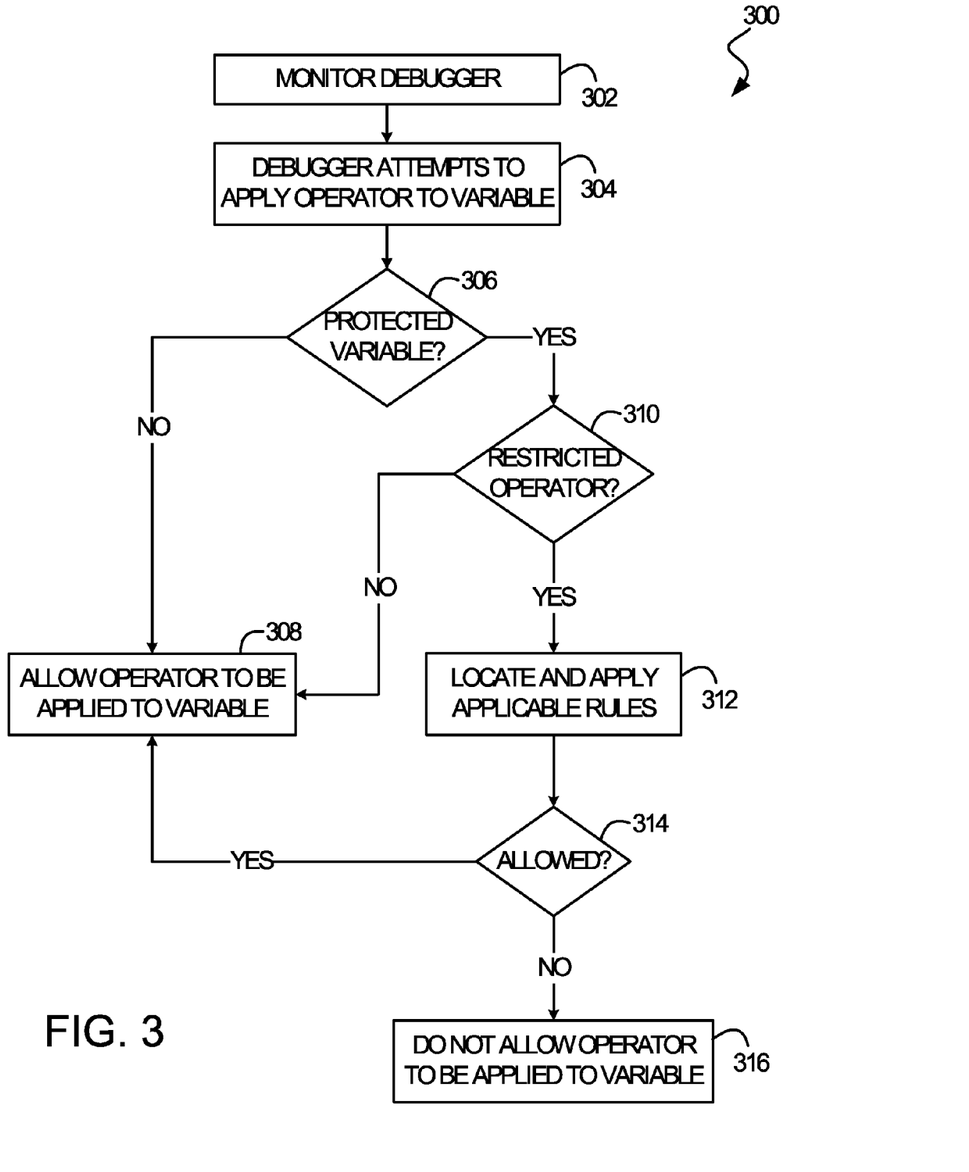
FIG. 3 depicts a flow chart of an example process for controlling access to variables protected by an alias, according to an embodiment of the invention.

FIG. 3 depicts a flow chart of example process 300 for controlling access to variables protected by an alias, according to an embodiment of the invention. The process 300 may be implemented while a developer using the debugger user interface 142 of the developer computer system 100B is performing a debug operation on a program 136 contained within the client computer system 100A. At block 302, the operation of the debugger may be monitored. This monitoring may be done by an application within the client computer system 100A, such as the monitoring application 140, which controls access to any confidential information associated with the program 136 being debugged. At block 304, the debugger may attempt to apply an operator to a variable. At block 306, a deciding operation may determine if the variable is protected by an alias. As previously mentioned, a variable protected by an alias may contain confidential information that requires the true value of the variable to be masked. The determination of whether the variable is protected by an alias may be made by referencing the alias protected variable data 134. If the variable is listed as a variable 202 within the alias protected variable data 134, then the variable is an alias protected variable. If the variable is not an alias protected variable, the process 300 proceeds to block 308 where the operator is allowed to be applied to the variable.

Returning to block 306, if the variable is determined to be an alias protected variable, then the process 300 may proceed to block 310 where a deciding operation determines if the operator is a restricted operator. As previously mentioned, the application of operators may be restricted in order to prevent the discovery of the true value of variables protected by an alias. The determination of whether the operator is a restricted operator may be made my referencing the alias protected variable data 134. If the operator is listed as an operator 204 within the alias protected variable data 134, then the operator is a restricted operator. If the operator is not a restricted operator, the process 300 proceeds to block 308 where the operator is allowed to be applied to the variable.

Returning to block 310, if the operator is determined to be a restricted operator, then the process 300 may proceed to block 312 where the rules controlling access to variables protected by an alias are located and applied. These rules may be the access rules 138 located within the client computer system 100A. In various embodiments, an access rule 138 may include referencing the alias protected variable data 134. For example, if the variable is listed as a variable 202 within the alias protected variable data 134, and the operator is listed as an operator 204 within the alias protected variable data 134, then the access rule 138 may include comparing the value of the threshold field 206 to the value of the count field 208 associated with the operator 204 and the variable 202.

At block 314, a deciding operation may determine whether the debugger is allowed to apply the operator 204 to the variable 202. As previously mentioned, this determination may include comparing the value of the threshold field 206 to the value of the count field 208 associated with the operator 204 and the variable 202. If the value of the count field 208 is less than the value of the threshold field 206, then the application of the operator 204 to the variable 202 is allowed, the value of the count field 208 is incremented by a value of one, and the process 300 may proceed to block 308. If the value of the count field 208 is equal to or greater than the value of the threshold field 206, then the application of the operator 204 to the variable 202 is not allowed and the process 300 may proceed to block 316. At the conclusion of the operations included in blocks 308 and block 316, the process 300 may return to block 302 to continue monitoring the operation of the debugger. The process 300 may run for the entire duration of a debug session and any or all of the operations may be executed as many times as necessary as required by the particular debug session.

Referring back to FIG. 1, in various embodiments, the computer system 100A may be a multi-user mainframe computer system, a single-user system, or a server computer or similar device that has little or no direct user interface, but receives requests from other computer systems (clients). In other embodiments, the computer system 100A may be implemented as a desktop computer, portable computer, laptop or notebook computer, tablet computer, pocket computer, telephone, smart phone, or any other appropriate type of electronic device. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100A and that, when read and executed by one or more processors in the computer system 100A, or when interpreted by instructions that are executed by one or more processors, cause the computer system 100A to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable storage medium. For example, a computer-readable storage medium may be, but not limited to, an electronic, magnetic, optical, electromagnetic, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method of controlling access to variables by a debugger during a debug session, the method comprising:
    monitoring, during the debug session, attempts by the debugger to access a variable, an alias masking confidential information contained in the variable;
    identifying, during the debug session, an attempt for an access of the variable, the access of the variable applying an operator to the variable;

identifying a rule associated with the variable, the rule associating accesses that apply the operator with a threshold;
determining that an access count is below the threshold, the access count of the accesses that apply the operator to the variable;
incrementing the access count based on the allowing the access of the variable;
allowing the access of the variable based on the rule;
identifying, during the debug session, an attempt for a second access of the variable, the second access of the variable applying the operator to the variable;
determining that the access count is not below the threshold; and
disallowing the second access of the variable based on the rule.

2. The method of claim 1, wherein the operator is selected from the group consisting of:
a mathematical operator;
an array operator; and
a Boolean operator.

3. The method of claim 1, further comprising:
identifying, during the debug session, an attempt for a second access of the variable, the second access of the variable applying a second operator to the variable;
identifying a second rule associated with the variable, the second rule disallowing accesses that apply the second operator; and
disallowing the second access of the variable based on the second rule.

4. The method of claim 1, further comprising:
monitoring, during the debug session, attempts by the debugger to access a second variable, a second alias masking confidential information contained in the second variable;
identifying, during the debug session, an attempt for an access of the second variable, the access of the second variable applying the operator to the second variable;
identifying a second rule associated with the second variable, the second rule controlling accesses that apply the operator; and
disallowing the access of the second variable based on the second rule.

5. A non-transitory computer readable storage medium for controlling access to variables by a debugger during a debug session, the medium having instructions stored thereon which, when executed, cause a processor to perform a method comprising:
monitoring, during the debug session, attempts by the debugger to access a variable, an alias masking confidential information contained in the variable;
identifying, during the debug session, an attempt for an access of the variable, the access of the variable applying an operator to the variable;
identifying a rule associated with the variable, the rule associating accesses that apply the operator with a threshold;
determining that an access count is below the threshold, the access count of the accesses that apply the operator to the variable;
incrementing the access count based on the allowing the access of the variable;
allowing the access of the variable based on the rule;
identifying, during the debug session, an attempt for a second access of the variable, the second access of the variable applying the operator to the variable;
determining that the access count is not below the threshold; and
disallowing the second access of the variable based on the rule.

6. The storage medium of claim 5, wherein the operator is selected from the group consisting of:
a mathematical operator;
an array operator; and
a Boolean operator.

7. The storage medium of claim 5, wherein the method further comprises:
identifying, during the debug session, an attempt for a second access of the variable, the second access of the variable applying a second operator to the variable;
identifying a second rule associated with the variable, the second rule disallowing accesses that apply the second operator; and
disallowing the second access of the variable based on the second rule.

8. The storage medium of claim 5, wherein the method further comprises:
monitoring, during the debug session, attempts by the debugger to access a second variable, a second alias masking confidential information contained in the second variable;
identifying, during the debug session, an attempt for an access of the second variable, the access of the second variable applying the operator to the second variable;
identifying a second rule associated with the second variable, the second rule controlling accesses that apply the operator; and
disallowing the access of the second variable based on the second rule.

9. A computer system for controlling access to variables by a debugger during a debug session, the computer system including a processor and a memory encoded with instructions, wherein the instructions when executed on the processor perform a method comprising:
monitoring, during the debug session, attempts by the debugger to access a variable, an alias masking confidential information contained in the variable;
identifying, during the debug session, an attempt for an access of the variable, the access of the variable applying an operator to the variable;
identifying a rule associated with the variable, the rule associating accesses that apply the operator with a threshold;
determining that an access count is below the threshold, the access count of the accesses that apply the operator to the variable;
incrementing the access count based on the allowing the access of the variable;
allowing the access of the variable based on the rule;
identifying, during the debug session, an attempt for a second access of the variable, the second access of the variable applying the operator to the variable;
determining that the access count is not below the threshold; and
disallowing the second access of the variable based on the rule.

10. The computer system of claim 9, wherein the operator is selected from the group consisting of:
a mathematical operator;
an array operator; and
a Boolean operator.

11. The computer system of claim 9, wherein the method further comprises:

identifying, during the debug session, an attempt for a second access of the variable, the second access of the variable applying a second operator to the variable;

identifying a second rule associated with the variable, the second rule disallowing accesses that apply the second operator; and disallowing the second access of the variable based on the second rule.

12. The computer system of claim 9, wherein the method further comprises:

monitoring, during the debug session, attempts by the debugger to access a second variable, a second alias masking confidential information contained in the second variable;

identifying, during the debug session, an attempt for an access of the second variable, the access of the second variable applying the operator to the second variable;

identifying a second rule associated with the second variable, the second rule controlling accesses that apply the operator; and disallowing the access of the second variable based on the second rule.

* * * * *